H. A. RHODES.
DIFFERENTIAL SPEED MECHANISM.
APPLICATION FILED JULY 20, 1909.
981,689.
Patented Jan. 17, 1911.
3 SHEETS—SHEET 1.
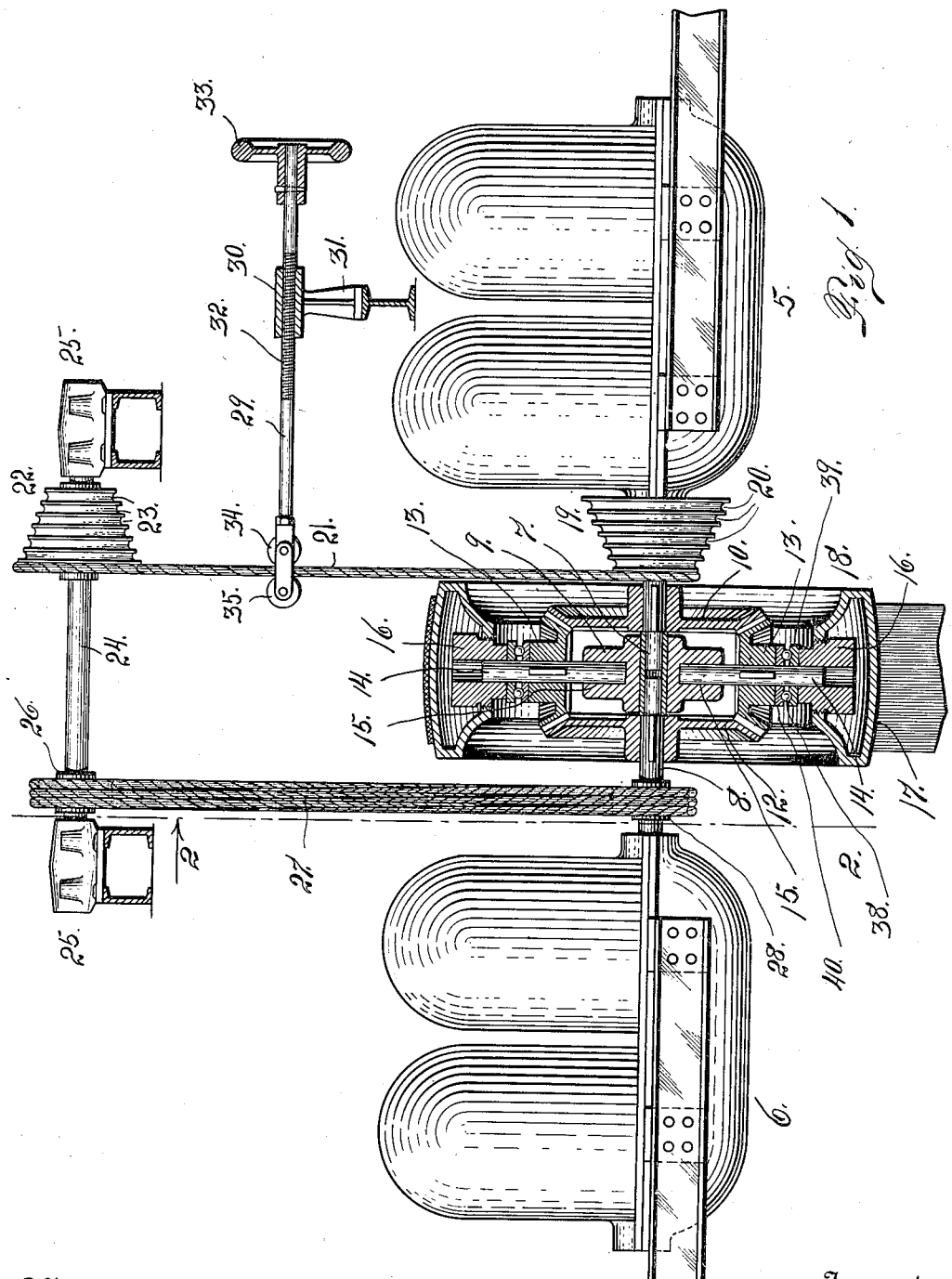
Witnesses
Otto E. Haddick.
Harry J. Simmons
Inventor
Harry A. Rhodes.
By A. J. O'Brien.
Attorney

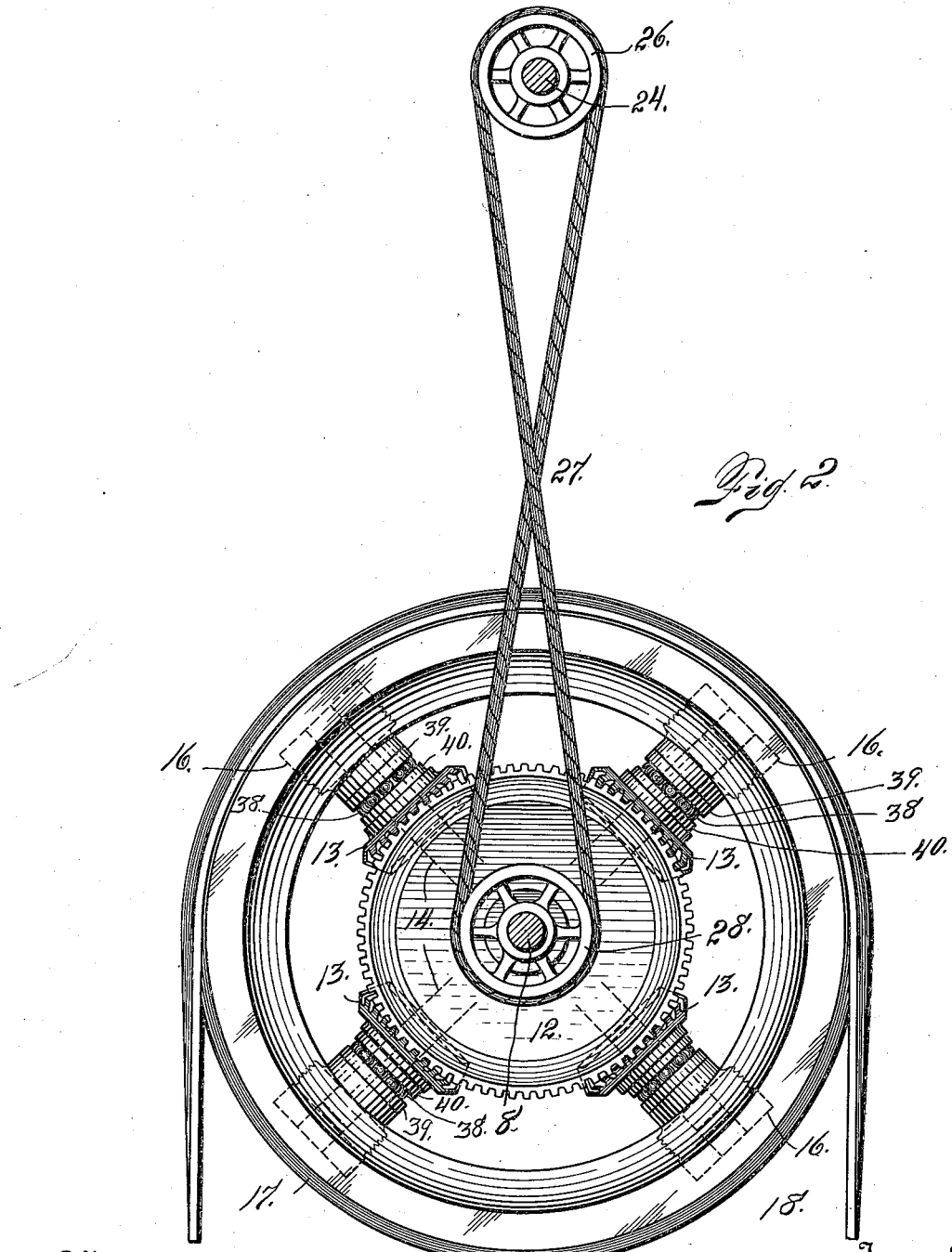

H. A. RHODES.
DIFFERENTIAL SPEED MECHANISM.
APPLICATION FILED JULY 20, 1909.
981,689.
Patented Jan. 17, 1911.
3 SHEETS—SHEET 3.
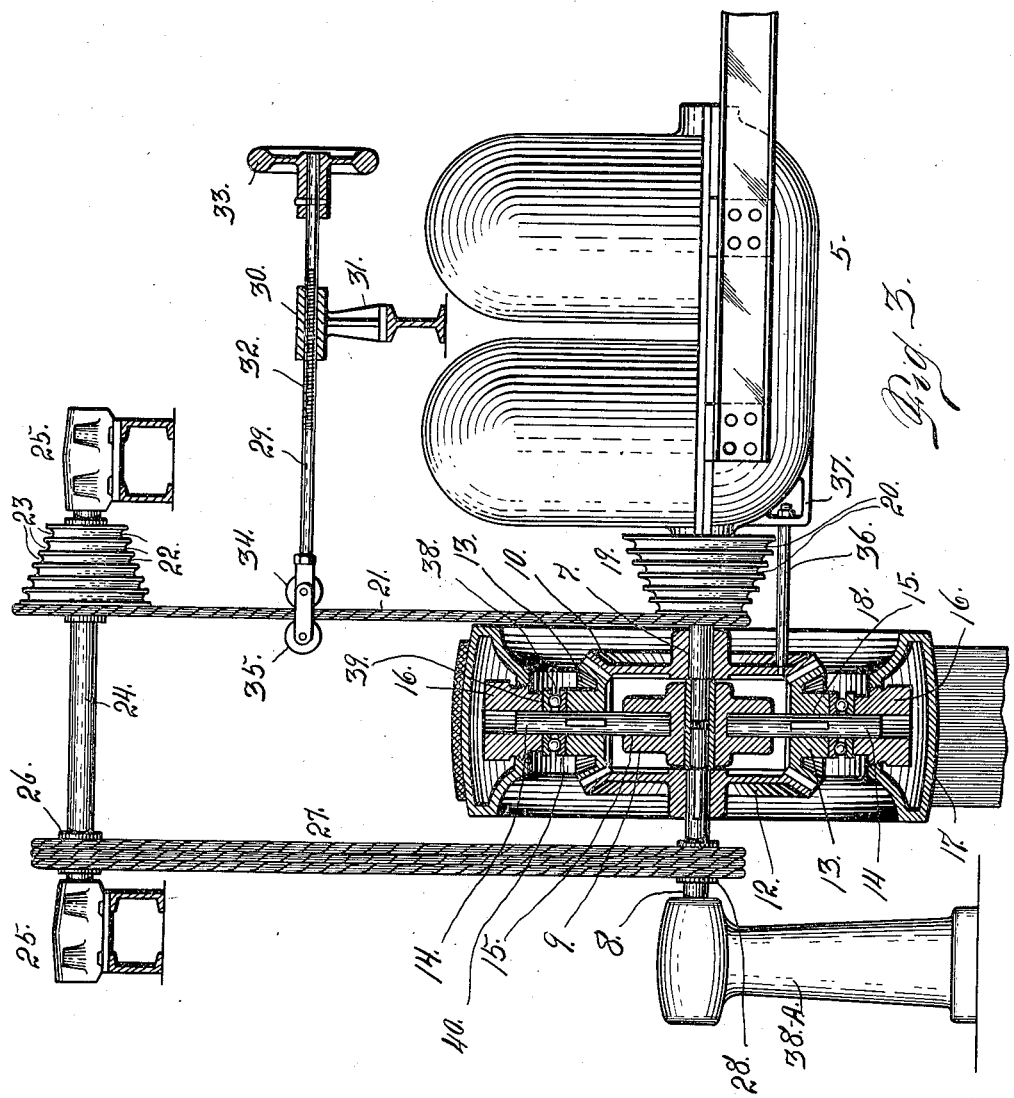

UNITED STATES PATENT OFFICE.

HARRY A. RHODES, OF DENVER, COLORADO, ASSIGNOR TO THE UNIVERSAL MOTOR COMPANY, OF DENVER, COLORADO, A CORPORATION OF ARIZONA TERRITORY.

DIFFERENTIAL-SPEED MECHANISM.

981,689.

Specification of Letters Patent. Patented Jan. 17, 1911.

Application filed July 20, 1909. Serial No. 508,656.

*To all whom it may concern:*

Be it known that I, HARRY A. RHODES, a citizen of the United States, residing in the city and county of Denver and State of Colorado, have invented certain new and useful Improvements in Differential-Speed Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in differential speed mechanism, whereby the differential speed between two shafts rotating in opposite directions is communicated to a third member, thus operating the third member at any desired or relatively slow speed, regardless of the initial speed of the two operating shafts or engines.

In my improved construction two distinct engines may be employed, each engine operating its shaft in a direction the opposite of the other, and if we assume that the two engines are rotating in opposite directions at equal speeds and that their shafts are connected through suitable gears with the third member, the latter will have no orbital travel, since the shafts of the two motors rotating in opposite directions, do exactly neutralize each other, so far as the orbital travel of the third member is concerned, the gears however, of the third member, are of course rotated upon their individual axes, since the oppositely rotating gears of the two engines coöperate to rotate the gears of the third member upon their axes, while the motion of each engine exactly neutralizes the motion of the other, so far as the orbital travel of the third member is concerned.

Having briefly outlined my improved construction, I will proceed to describe the same in detail, reference being made to the accompanying drawing, in which is illustrated an embodiment thereof.

In this drawing: Figure 1 is a view illustrating two engines arranged on opposite sides of a pulley or third member, to which the differential speed is to be communicated, the third member being shown in section. Fig. 2. is a section taken on the line 2—2, Fig. 1, looking toward the right. Fig 3. is a view similar to Fig. 1, but showing a modified form of construction.

The same reference characters represent the same parts in all the views.

Let the numerals 5 and 6 designate two engines of any suitable construction, and for the purpose of this specification they may be termed internal combustion engines or motors, though it must be understood that the operation of the mechanism will be the same, regardless of the construction of engine or motor, which may be employed. One engine is provided with an operating shaft 7, and the other with a similar shaft 8, the two shafts entering a central hub 9, which is loose on both shafts. The shaft 7 is provided with a fast gear 10, while the shaft 8 is provided with a similar fast gear 12, of the same size, the two gears being arranged in opposing relation, and engaging a series of gears 13, each fast upon an individual shaft 14.

One extremity of each shaft 14 is journaled in a hub 9, as shown at 15, while the other extremity is journaled in a hub 16, mounted in the rim 17, of a pulley wheel 18. In this case the inner extremities of all of the shafts 14, are journaled in the hub 9, while their outer extremities are respectively journaled in individual hubs or bearings 16, forming a part of the rim of the pulley wheel, the said bearings being concealed by the rim proper, of the said wheel. It will therefore be understood that the shafts 14 form the spokes of the pulley wheel, while the hub 9 forms the hub of said wheel. Hence when the wheel is rotating, its spokes together with the gears 13, mounted thereon, not only rotate on their individual axes, but also have an orbital travel with the pulley, proportional to the differential speed between the shafts 7 and 8,—the direction of the pulley's rotation being determined by the direction of rotation of the shaft having the greater speed.

As has already been stated, if we assume that the two shafts 7 and 8 are rotating in opposite directions, and at the same speed, the action of their gears 10 and 12, upon the gears 13, would exactly neutralize each other, so far as orbital travel is concerned, and while the gears 13, together with their shafts 14, would be rotating on their individual axes, they would have no orbital travel and the pulley wheel 18 would remain stationary. Hence in order to produce any desired differential or difference in speed, between the two shafts, it is necessary to provide a speed regulating device, which will now be described, special reference being made to Fig. 1 of the drawing.

Upon the outer extremity of the shaft 7, adjacent to the pulley wheel and between the latter and the engine 5, is located a cone pulley 19, having a series of circumferential grooves 20, formed on its face, each groove forming a seat for a cable 21, which is adapted to be shifted upon the pulley for speed regulating purposes. The cable 21 also engages a second, but reversely arranged cone pulley 22, having circumferential grooves 23, each forming a distinct seat or bearing for the cable. This pulley 22 is mounted on and made fast to a third shaft 24, journaled in suitable bearings 25. Upon this shaft 24 is also mounted and made fast a pulley 26, which is connected by means of a crossed belt 27, with a pulley 28, of the same size, fast on the shaft 8. As shown in the drawing, see Fig. 1, the pulleys 26 and 28 have their faces grooved to receive three crossed belts 27, in order to give the necessary strength to the belt connection between the two pulleys, since the belts as illustrated in the drawing are in the form of ropes or cables. For the purposes of this specification, a single belt only, need be mentioned. As the pulleys 26 and 28 are of the same size, the shaft 8 cannot move faster than the shaft 24, and if the belt 21 is so adjusted upon the cone pulleys 19 and 22, as to give the shaft 24 a speed less than the shaft 7, the speed of the shaft 8 will be less than the speed of the shaft 7, and the differential speed between the two shafts will be communicated to the pulley wheel. Still referring to Fig. 1, it will be observed that the belt 21 engages the smallest groove 20 of the pulley 19, while the same belt engages the largest groove 23, of the pulley 22. Hence the speed of the pulley 22, will be less than that of the pulley 19, and this lesser speed will determine the rotary movement of the shaft 8. In this event the two shafts 7 and 8, with their gears 10 and 12, will coöperate to rotate the gears 13, of the pulley wheel, together with their shafts 14, but the rotary movement of the shaft 8, in a direction the opposite of the shaft 7, will neutralize the rotary movement of the pulley wheel, and the travel of the latter will be equal to the differential speed between the two shafts 7 and 8. At the same time, however, the power of both engines is communicated to the pulley wheel, but its speed is determined by manipulating the belt 21 or shifting the latter upon the two cone pulleys 19 and 22. This shifting of the belt 21, may be accomplished in any suitable manner.

As shown in the drawing, a screw shaft 29 is threaded to travel in a stationary nut 30, mounted upon a support 31. This shaft has a threaded portion 32, which engages the threads of the nut. Its outer extremity is equipped with an operating hand wheel 33, while its inner extremity carries two separate rollers 34 and 35, which occupy positions on opposite sides of the belt 21. It will thus be observed that if the screw shaft 29 be operated to travel longitudinally toward the right, see Fig. 1, the belt 21 will be shifted to cause the said belt to occupy a smaller groove upon the pulley 22, and a larger groove upon the pulley 19, than the said belt occupies, as shown in Fig. 1. This adjustment of the belt 21, will of course change to a certain extent, the differential speed between the shafts 7 and 8. If the belt 21 be still further shifted in the same direction, until it engages the central groove of each pulley, both pulleys will be rotating at the same speed, which will also be true of the shafts 7 and 8, the consequence being that there is no difference between the speed of the two shafts, and in this event the pulley wheel 18 will remain stationary. Again, if the belt 21 be further shifted toward the right, there will be a differential speed in favor of the shaft 8, since as soon as the belt passes the middle groove of the two pulleys, toward the right, the higher speed will change from the shaft 7 to the shaft 8, and the pulley wheel will begin to travel in the opposite direction, and its speed will increase if the belt 21 be further shifted, until it occupies the smallest groove on the pulley 21, and the largest groove upon the pulley 20.

In the modified form of construction shown in Fig. 3, it is assumed that the gear 10 is stationary, and that the speed of the pulley wheel 18, is determined entirely by the rotation of the shaft 7, and the adjustment of the belt 21, upon the cone pulleys, through the instrumentality of the regulating device heretofore explained. In this form of construction there is only one engine, namely the one with which the shaft 7 is connected. The movement of the shaft 8, is imparted alone from the shaft 7, and the rotation of the shaft 8 may be faster or slower than the shaft 7, according to the adjustment of the belt 21. In any event however, the pulley wheel 18 must rotate, and its travel will be determined entirely by the speed of the shaft 8, communicated from the shaft 7. In this case if the belt 21 is in the position shown in Fig. 3, the movement of the shaft 8 will be slower than that of shaft 7, while if the belt be shifted toward the right to the middle groove of both cone pulleys, the movement of both shafts 7 and 8 will be the same, but as the gear 10 is stationary, the pulley wheel 18 will be rotated according to the speed of the shaft 8, imparted through the gears 12 and 13. Again, if the belt 21 be still further shifted, so that it shall occupy the largest groove of the cone pulley 19, and the smallest groove of the cone pulley 22, the maximum speed will be communicated to the shaft 8, and consequently to the pulley 18.

In the construction shown in Fig. 3, a rod 36 is connected with the gear 10, to prevent the rotation of the latter. One extremity of this rod is connected with the gear, while the opposite extremity is secured to a bracket 37, formed on the engine frame. Attention is called to the fact that the hubs of the gears 13 of the pulley wheel 18, engage the inner extremities of the bearings 16, of the said wheel. Since the gears 13 must be free to rotate on their individual axes, ball bearings 38 are interposed between the bearing members 16, and the gears 13, the two members 16 and 13 being equipped with steel plates 39 and 40, provided with ball races for the purpose.

Having thus described my invention, what I claim is:

1. The combination of two shafts mounted to rotate, individual motors for rotating the respective shafts in opposite directions, a speed regulating device interposed between the two shafts for producing any desired differential speed, said regulating device including a countershaft, cone pulleys respectively mounted on the countershaft and one of the first named shafts, and a connection between the countershaft and the other of the first named shafts, for transmitting the movement of the countershaft to the latter, substantially as described.

2. The combination with two independent motors, of an interposed wheel, comprising a hub, a rim, and shafts journaled in the hub at one extremity and in the rim at the opposite extremity, gears mounted on the respective shafts, two opposing gears meshing with the gears of the wheel and connected to be rotated in reverse directions by the two motors, and a speed regulating device interposed between the two last named gears for producing any desired differential speed.

3. The combination with two independent motors, gears connected with the motors to be rotated in reverse directions, a wheel connected with the two gears to utilize the differential speed of the latter, a shaft upon which each of the gears is mounted, a cone pulley fast on the shaft of one of the motor gears, a countershaft carrying a second cone pulley, the latter being reversely arranged, a belt connecting the two cone pulleys, means for shifting the belt on the pulleys to regulate the speed of their respective shafts, and means for transmitting motion from the countershaft to the shaft of the other motor gear, substantially as described.

4. The combination of two coaxially arranged, independent shafts mounted to rotate in opposite directions and at different speeds, a wheel whose hub is loose on the said shafts, gears arranged on the respective shafts on opposite sides of the wheel hub, interposed gears mounted upon the spokes or radial shafts of the wheel and meshing with the first named gears, the inner extremities of the spokes or radial shafts being journaled in the wheel hub, while their outer extremities are journaled in the rim of the wheel, and speed regulating means for varying the speed of the first named shafts, consisting of a cone pulley fast on the shaft of one of the motor gears, a countershaft, a second cone pulley mounted on the said countershaft, the said cone pulley being reversely arranged, a belt connecting the two cone pulleys and shiftably mounted thereon, whereby the speed of the respective shafts is regulated, and means for transmitting motion from the shaft of the motor gear, substantially as described.

5. In a differential speed mechanism, the combination of two members mounted to rotate, two independent motors connected to rotate the respective members in opposite directions, a third member mounted to rotate and arranged to utilize the differential speed of the first named members, a cone pulley in operative relation with one of the first named members, a second cone pulley reversely arranged, a belt connecting the two cone pulleys and means for shifting the belt on the pulleys for regulating the speed of the first named members, and means for transmitting motion from the second named cone to one of the first named members, substantially as described.

In testimony whereof I affix my signature in presence of two witnesses.

HARRY A. RHODES.

Witnesses:
A. J. O'BRIEN,
JESSIE F. HOBART.